United States Patent
Yoma (10) Patent No.: US 8,050,920 B2
(45) Date of Patent: Nov. 1, 2011

(54) BIOMETRIC CONTROL METHOD ON THE TELEPHONE NETWORK WITH SPEAKER VERIFICATION TECHNOLOGY BY USING AN INTRA SPEAKER VARIABILITY AND ADDITIVE NOISE UNSUPERVISED COMPENSATION

(75) Inventor: Néstor Jorge Becerra Yoma, Santiago (CL)

(73) Assignee: Universidad de Chile, Santiago (CL)

( * ) Notice: Subject to any disclaimer, the term of this patent is extended or adjusted under 35 U.S.C. 154(b) by 825 days.

(21) Appl. No.: 12/016,622

(22) Filed: Jan. 18, 2008

(65) Prior Publication Data

US 2009/0187404 A1    Jul. 23, 2009

(51) Int. Cl.
*G10L 17/00* (2006.01)
(52) U.S. Cl. ...................................... 704/246
(58) Field of Classification Search .................. None
See application file for complete search history.

(56) References Cited

U.S. PATENT DOCUMENTS

| | | | |
|---|---|---|---|
| 5,805,674 A * | 9/1998 | Anderson, Jr. | 379/93.03 |
| 6,119,084 A | 9/2000 | Roberts et al. | |
| 6,606,596 B1 * | 8/2003 | Zirngibl et al. | 704/270 |
| 6,718,306 B1 * | 4/2004 | Satoh et al. | 704/246 |
| 6,879,968 B1 | 4/2005 | Hayakawa et al. | |
| 7,194,069 B1 * | 3/2007 | Jones et al. | 379/88.02 |

OTHER PUBLICATIONS

Jayant M. Naik, "Speaker Verification: A Tutorial", IEEE Communications Magazine, Jan. 1990, p. 42-48.*
Joseph P. Campbell, "Speaker Recogniton: A Tutorial", Proc. IEEE, vol. 85, p. 1437-1462, Sep. 1997.*
George R. Doddington et al. ,"The NIST speaker recognition evaluation", Speech Communication, vol. 31, p. 225-254, Jun. 2000.*
R. M. Nickel "Automatic Speech Character Identification", IEEE Circuits and Systems Magazine, p. 8-29, Fourth Quarter 2006.*
Barras, et al., Unsupervised Online Adaptation for Speaker Verification over the Telephone, Odyssey 2004, The Speaker and Language Recognition Workshop, May 31-Jun. 3, 2004, Toledo, Spain (cover + 4 pages).
Mariethoz et al., A Comparative Study of Adaptation Methods for Speaker Verification, 7th International Conference on Spoken Language Processing, Sep. 16-20, 2002, Denver, Colorado (cover + 4 pages).
Furui, S., Recent advances in speaker recognition, Pattern Recognition Letters, vol. 18, 1997, pp. 859-872 (14 pages).

* cited by examiner

*Primary Examiner* — Talivaldis Ivars Smits
(74) *Attorney, Agent, or Firm* — Hasse & Nesbitt LLC; Daniel F. Nesbitt (57) ABSTRACT

A large-scale attendance, productivity, activity and availability biometric control method using the telephone network, for individual client users with speaker verification technology based on limited enrolling data and short verification sentences. The method includes the steps of registering and enrolling a client user; generating, storing and indexing a template and a reference average spectrum with a client user PIN; prompting the client user during a future verification event to pronounce the enrolling/verification sentence associated with the PIN to provide a speech signal; estimating a verification distance between the PIN indexed template and the speech signal pronounced by the client user, using the PIN reference average spectrum indexed; validating the telephone number; deciding if the pronounced speech signal pronounced by the client user has been validated based on the verification distance, with unsupervised compensation of the noisy input signal's spectrum if its difference from the speaker model is small, instead of adapting the user model spectrum; optionally repeating the steps of prompting, estimating, validating and deciding for a limited number of times; and accepting or rejecting the future verification event.

14 Claims, 7 Drawing Sheets

BIOMETRIC CONTROL METHOD ON THE TELEPHONE NETWORK WITH SPEAKER VERIFICATION TECHNOLOGY BY USING AN INTRA SPEAKER VARIABILITY AND ADDITIVE NOISE UNSUPERVISED COMPENSATION

BACKGROUND OF THE INVENTION

In the last years, speaker verification technology has shown significant progress. For example, U.S. Pat. No. 6,879,968 describes a speaker verification apparatus that solves the problem of the acceptance threshold estimation by means of employing the following procedure:

First, given a speech signal from a user claiming an identity, the distance to every client template or model in the system is determined; and then, the probability density function of these distances is estimated.

Second, a signal score is obtained, depending if the user's distance is above or below given a percentile in the probability density function of distances obtained with all the templates or models in the system; then it decides if the speech signal corresponds to the claimed identity.

The system described in U.S. Pat. No. 6,879,968 partly solves the problem of the decision threshold estimation, but it does not consider explicitly False Acceptation (FA) nor False Rejections (FR) rates. Consequently, it could accept an excessive number of impostors or it could reject an excessive number of clients. Furthermore, the probability density function of distances must be considered for all the clients enrolled in the system, which implies that if an "n" number of clients are registered, the method requires "n" identification distance, which is also termed verification distance, or probability, evaluations for each identity verification event. This results in a non efficient system when "n" is a high number, e.g. over 100, which in fact is possible in a massive and large-scale application as the one described in U.S. Pat. No. 6,879,968. Also, U.S. Pat. No. 6,879,968 does not provide any solution to the problem of limited enrolling or verification data. In comparison, the current invention estimates the acceptance/rejection distance threshold using the desired false acceptance (FA) and false rejection (FR) rates as references according to the application. Of course, only one of the pair of FA and FR can be independently set.

Two key factors that prevent the deployment of speaker verification in large-scale applications are the requirements of long enrolling sessions and long verification sentences to guarantee low error rates (Barras, Meigner and Gauvain, 2004) (Mariethoz & Bengio, 2000). Both requirements are not compatible with large-scale applications on the telephone network because they reduce the usability of the service, and they lead to high traffic load and high rate of blocked calls.

U.S. Pat. No. 6,119,084 describes a speaker verification apparatus and a validation method wherein the user must pronounce one or more sentences for validating his identity; if one of the signals is similar enough regarding the template or model of the client whose identity is being validated, the system adapts and tries to capture the subject or individual voice variations throughout the time. In contrast, if the system does not validate the user identity, an alternative access control mechanism is used. Therefore, as disadvantages of the system can be mentioned the facts that the subject is forced to pronounce too many sentences, and the subject is forced to go to an alternative access control scheme if the voice verifying system does not validate the user's identity. On the other hand, if one of the voice inputs is similar enough to the client's template, this one is adapted to capture the subject variations—this procedure is named "unsupervised adaptation" and it refers to an adaptation process without human assistance. Therefore, if an error takes place in the adaptation procedure, this will be propagated and will result in a less reliable voice validation system. It is worth highlighting that supervised adaptation in not feasible in the context of a large-scale application like the one described here.

SUMMARY OF THE INVENTION

The present invention refers to a large-scale attendance, productivity, activity and availability biometric control method over telephone networks for individuals client users at work places. By making use of the individual identity (ID) verification with voice it is possible to register the permanence, entrance and exit times of employees. Also, it allows to registering and keeping records of the performed activity type. To achieve the above purposes, the system is able to receive inbound calls, and to make intelligent outbound calls. An active control on employees results from the method proposed here.

The current identity verification procedure with voice was designed to operate with limited enrolling data and short verification utterances in order to make possible the deployment of the large-scale attendance, productivity, activity and availability biometric control method proposed in this patent. To achieve this target two techniques are proposed here: an equalization method that makes use of the fact that, for a given user, enrolling and verification are done from the same telephone number; and, an unsupervised intra-speaker and noise compensation technique.

The present invention method exhibits as an advantage the fact that the input speech signal, and not the model, is modified to compensate for intra-speaker variability and noise. Consequently, the adaptation error mentioned above is avoided.

Additionally, among the advantages the present method exhibits, when compared with existing systems for controlling individuals attendance to activities at working places, it can be mentioned the fact that the proposed method can be implemented using an ordinary telephone network (private or public) or an IP telephone network (private or public), with an already existing infrastructure. Moreover, it allows the online information availability of the validation time, the employed telephone number and user's own voice signal used for validation. Finally, the present invention supports the simultaneous authentication of several users, by making use of different telephone numbers.

Figure 1:
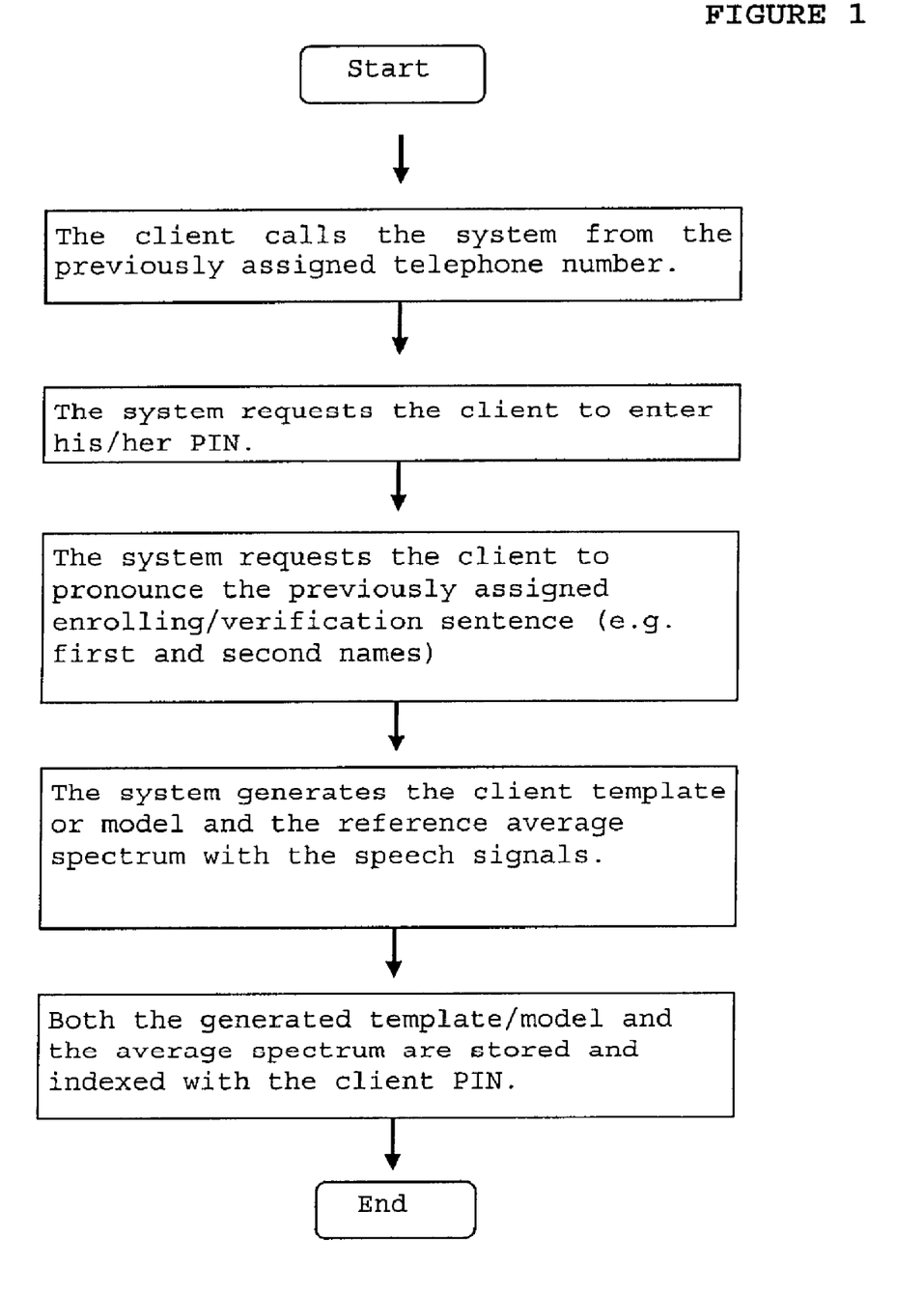
FIG. 1 shows the flow chart of the user's enrollment system.
Figure 2:
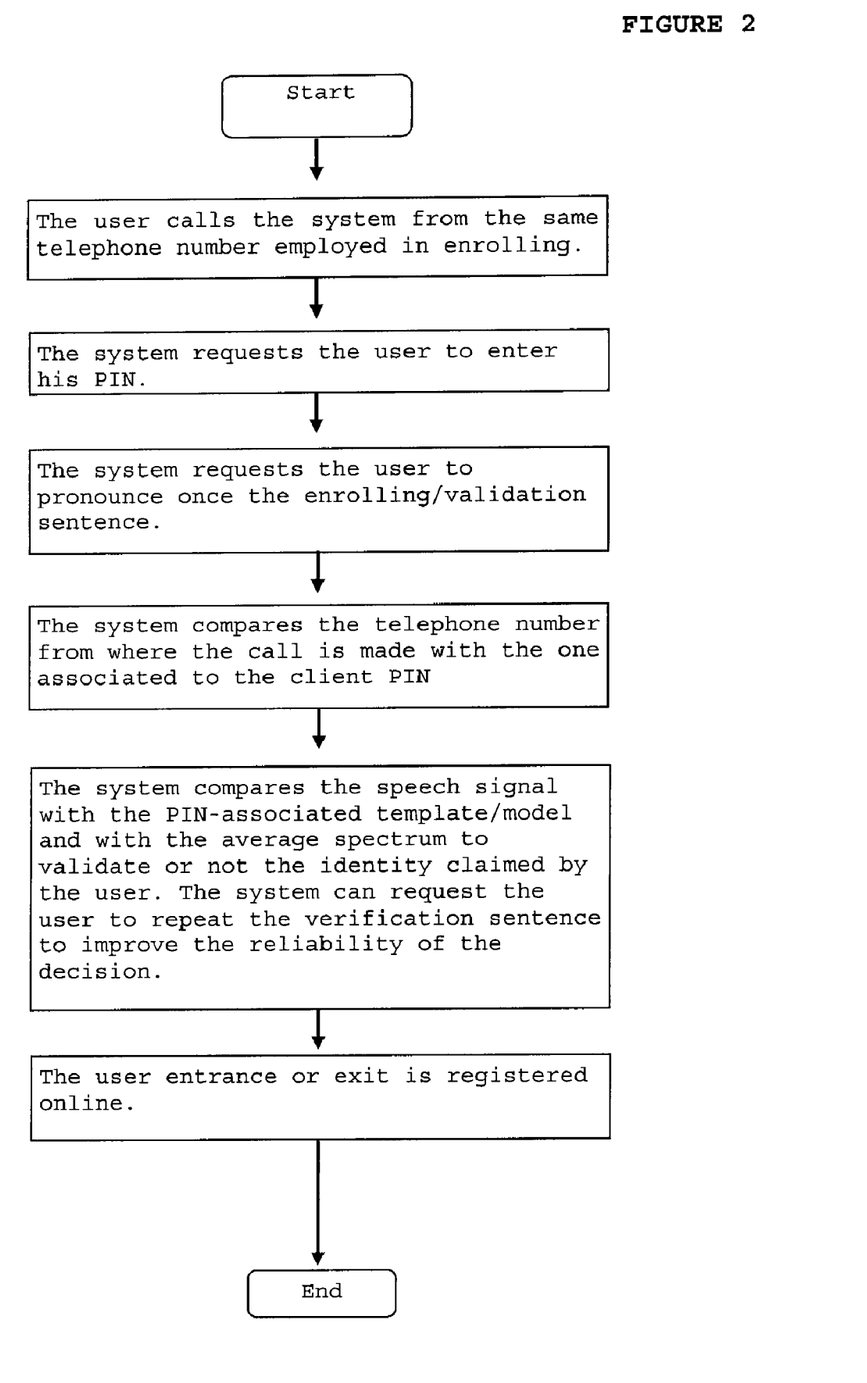
FIG. 2 shows the flow chart of the identity verification system for individuals with an incoming call.

Additionally, the system operates on an on-line basis. Consequently, it can show on a web site all the information concerning entrance, presence and exit times, and performed activities. Also, the system keeps records of any validation event for future subjective verifications To be considered as a valid client user, a user needs to be enrolled in the system. This process is schematically described in FIG. 1. Firstly the user must call the system from a previously assigned telephone number and enter his/her identification PIN. Secondly the user is prompted to pronounce a short sentence (speech signal), which lasts less than 10 seconds, particularly, less than 5 seconds (e.g. first and last names, company name, etc.), a given number of times such as 3 or more times. The enrolling engine generates the client's template, model and reference average spectrum by employing the speech signal. Both the template/model and the average spectrum are indexed with the client PIN. Once the enrollment process has been completed, the system can be used in three different embodiments:

Embodiment 1: It allows the client to call the system to register his/her entrance or exit (FIG. 2).

Figure 3:
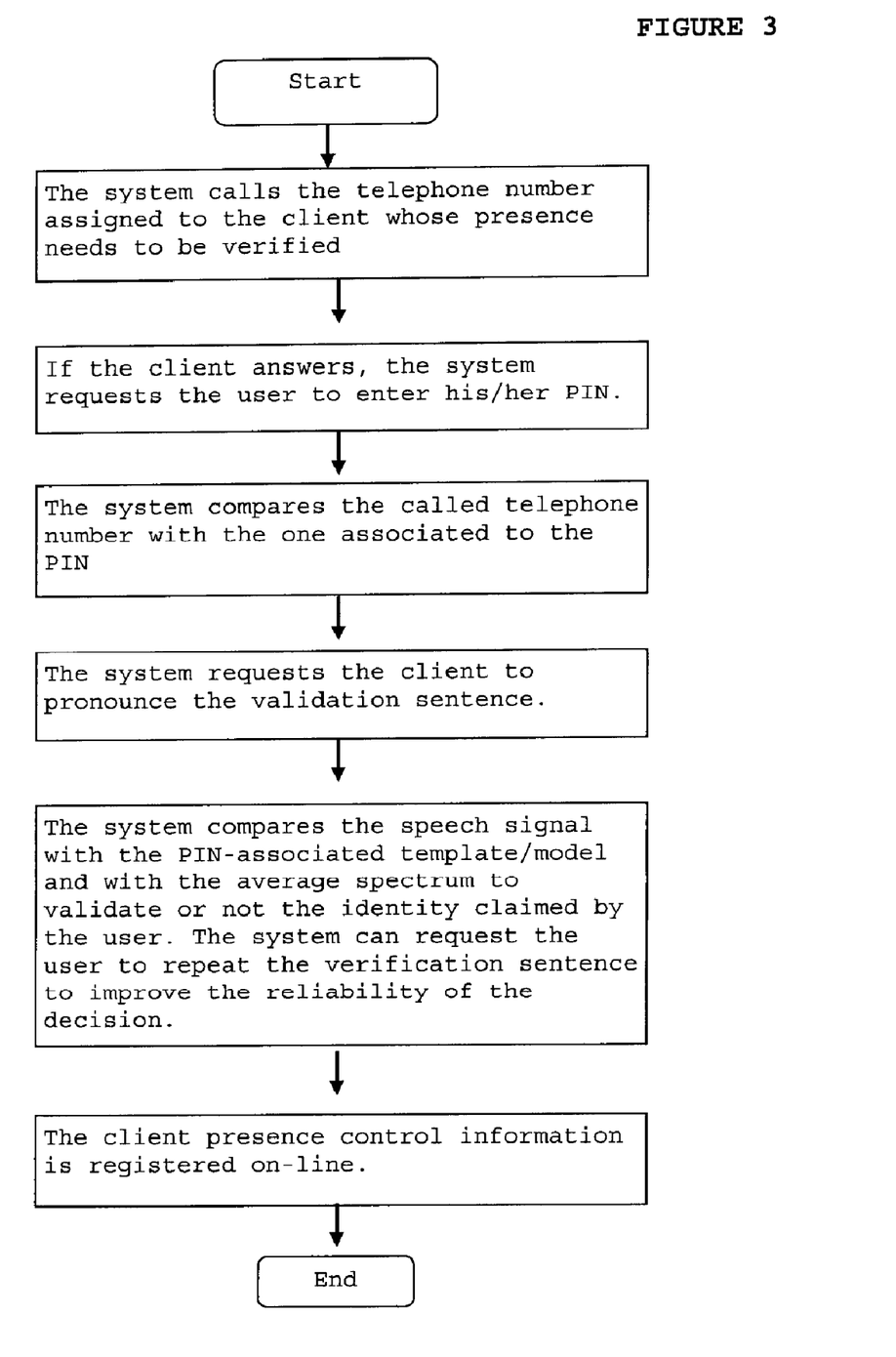
FIG. 3 shows the flow chart of the identity verification system with an outgoing call.

Embodiment 2: It allows the system to call a given client and to check his presence at the assigned place (FIG. 3).

Figure 4:
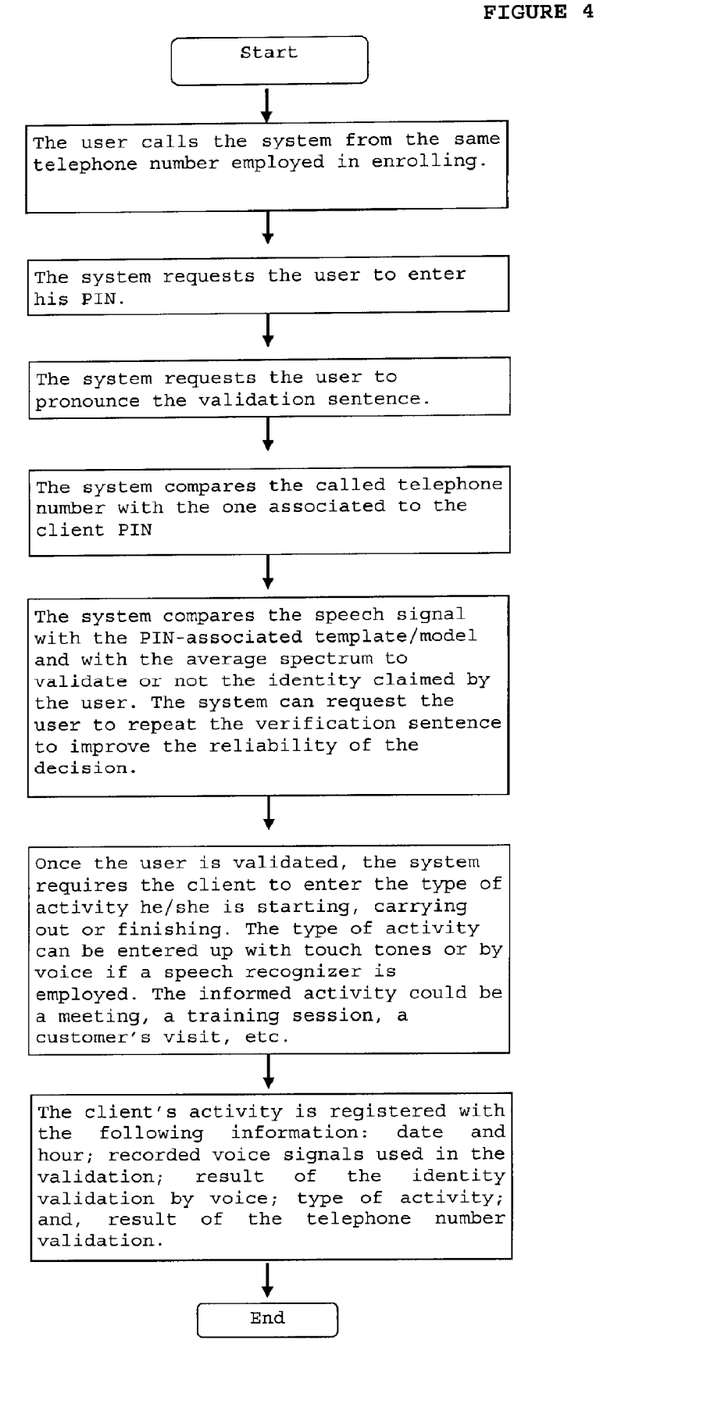
FIG. 4 shows the flow chart of the client activity report system with an incoming call.

Embodiment 3: It qualifies the client for reporting the entrance or exit to a given activity (FIG. 4); this embodiment can be implemented in combination with touch tones or speech recognition to enter the type of activity.

A stand out advantage of the present invention is the fact that it allows the large-scale human resources management by making use of telephone networks, which in turn makes unnecessary additional infrastructure installation.

The present invention provides in a first aspect a large-scale attendance, productivity, activity and availability biometric control method using the telephone network, for individual client users at their work places, with speaker verification technology based on limited enrolling data and short verification sentences. The method comprises the steps of:

i) registering one or more system clients by entering, for each system client, a user name for a client user, an enrolling/verification sentence, a personal identification number (PIN) associated to the client user and a telephone number from where a subsequent enrolling and verification steps will take place;

ii) enrolling the client user comprising requesting each client user to enter the associated PIN and to pronounce the enrolling/verification sentence, thereby providing voice signals;

iii) generating a template and a reference average spectrum according to equation (1) with the voice signals provided by the user in the enrolling step;

iv) storing and indexing the template and the reference average spectrum with the PIN associated to the client user;

v) prompting the client user during a future verification event to enter the PIN and to pronounce the enrolling/verification sentence associated with the PIN, thereby providing a speech signal;

vi) estimating a verification distance, in the future verification event, between the template indexed by the entered PIN and the speech signal pronounced by the client user; using the reference average spectrum indexed by the entered PIN;

vii) validating that the telephone number employed in the future verification event is the same as the telephone number employed in the enrolling step;

viii) deciding if the speech signal pronounced by the client user has been validated based on the verification distance;

ix) repetiting the steps of prompting, estimating, validating and deciding for a limited number of times, if the speech signal pronounced by the client user fails validation; and x) accepting or rejecting the future verification event.

The present invention provides in a second aspect a speaker verification apparatus to control attendance, productivity and presence of individuals at work places, wherein said equipment performs said control as indicated on the method disclosed above, and where the speaker verification apparatus operates with limited enrolling data and short enrolling/verification sentences.

The proposed control and human resources management method with speaker recognition technology provides clear advantages when compared with ordinary control methods that are currently used, such as the following:

Mechanical time clock, used in work places; it does not incorporate any biometric identity verification system, it needs manual computation of worked hours, and it is extremely vulnerable to fraud; it requires device and card holder installation.

Fingerprint; it requires a special device installation for identity verification; it needs Internet or network connectivity; generally, in these systems, the fingerprint image is not stored; adequate equipment and an expert are required to make a reliable subjective analysis; it is not able to monitor the individual position; it does not allow to register the performed activity type; it does not make outbound control calls; and, it does not allow to audit fraud attempts.

Electronic card; it is a much more reliable system and is able to obtain the worked-hours and overtime registry; nevertheless, it also requires a special device installation, and is vulnerable to fraud if the card is employed by an employee who is not the card's holder; it cannot monitor the individual position; it does not allow to register the performed activity type; it does not make outbound control calls; and, it does not allow to audit fraud attempts.

DETAILED DESCRIPTION OF THE INVENTION

Hereunder, the term "template" represents client's vocal patron, whereas the term "model" represents a group of templates. The system can add new records to the client's registry and create a new template.

Hereunder, the term "user" represents the individual, which uses an identity validation method. The term "client" or "client user" denotes the individuals recruited or enrolled in the identity validation system. Users can be considered "impostors" or "clients".

The term "PIN" (Personal Identification Number) as used herein, refers to an identification number or code, which is given or assigned to each client.

The term "ANI" (Automatic Number Identification) as used herein, refers to the ability of the system for identifying the telephone number from where a user is calling.

The terms "False Acceptance" (FA) and "False Rejection" (FR) refer to accept the validation of an impostor and to reject a client in the identity verification procedure, respectively.

The speaker verification technology and human resources management methods can be used in places such as offices, factories, laboratories, jails and all those places where it is necessary to maintain an attendance, exit, presence and activity control.

Figure 7:
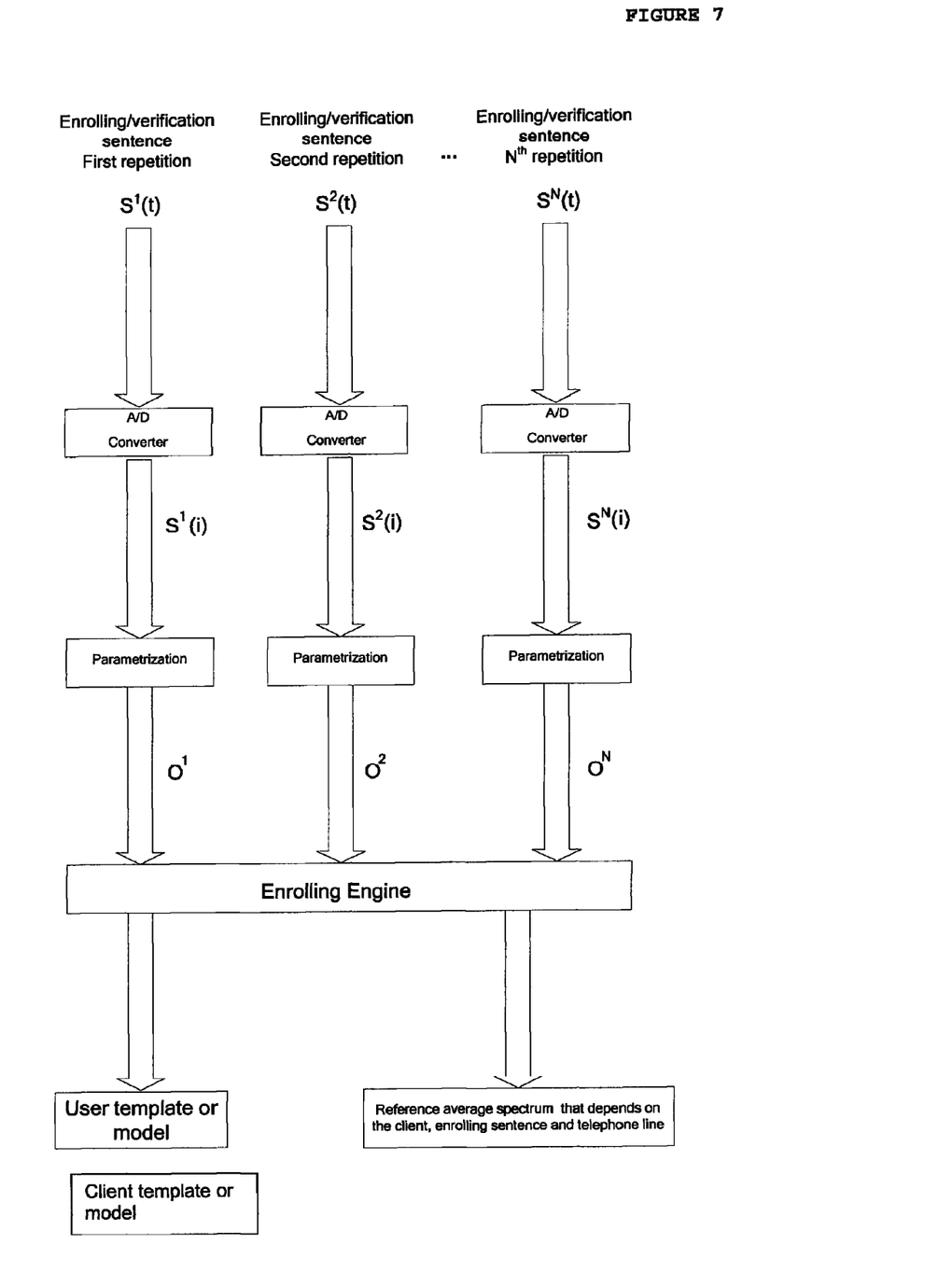
FIG. 7 shows a block diagram of the proposed enrollment method.

The enrolling mechanism is described in FIG. 7. Each one of the plurality speech signals recorded by the client ($S^1(t)$, $S^2(t)$, ..., $S^n(t)$, ..., $S^N(t)$) is processed by a digital-analog converter (A/D), wherein the plurality is "N". After the A/D conversion, the digital signals are denoted by $S^1(i)$, $S^2(i), \ldots, S^n(i), \ldots, S^N(i)$. The index "i" denotes that the signal is discrete. Then, the discrete signals are submitted to a standard process known as parametrization, which is composed of the following steps.

Each one of the signals $S^1(i), S^2(i), \ldots, S^n(i), \ldots, S^N(i)$ is divided into constant length windows.

An analysis is performed within every window on the spectrum logarithm domain, which gives a parameter vector as a result. Consequently, each discrete signal is represented by a sequence of coefficient or parameter vectors:

$$S^n(i) \xrightarrow{\text{Parametrization}} O_n = \left[ O_{n,1}, O_{n,2}, O_{n,3}, \ldots, O_{n,j}, \ldots, O_{n,J_n} \right]$$

Wherein "Jn" is the length in number of windows of signal "n" and, $O_{n,j} = [O_{n,j,1}, O_{n,j,2}, \ldots, O_{n,j,m}, \ldots, O_{n,j,M}]$ represents the "M" parameter vector in window or frame "j", in signal "n".

As a result of the enrolling process, a client template or model, and a spectrum average (that depends on the client, the pronounced sentence and the telephone line) are generated. The client template or model is indexed by its PIN and is denotes by $P_{PIN}$. The spectrum average corresponds to $\overline{O}_e = [\overline{O}_{e,1}, \overline{O}_{e,2}, \ldots, \overline{O}_{e,m}, \ldots, \overline{O}_{e,M}]$ wherein, $$\overline{O}_{e,m} = \frac{1}{N} \sum_{n=1}^{N} \overline{O}_{n,m} \quad \text{equation (1)}$$

$$\overline{O}_{n,m} = \frac{1}{Jn} \sum_{j=1}^{Jn} O_{n,j,m} \quad \text{equation (2)}$$

Figure 6:
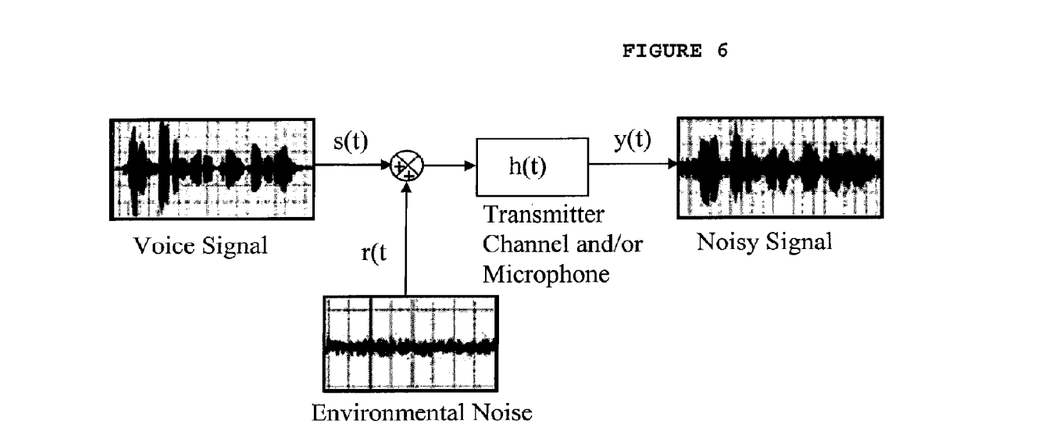
FIG. 6 shows, in a block diagram, a template for the transmitting channel and additive noise effect in the voice print engines.

FIG. 6 shows the transmitter channel and additive noise effect. The received signal can be represented as:

$$y(t) = h(t) * [s(t) + r(t)] \quad \text{equation (3)}$$

where * indicates convolution; r(t) is the additive noise; and, h(t) o H(w) (H(w) is the Fourier transform for h(t)) is the transmitter channel, also called convolution noise.

The convolutional noise effect can be reduced with Cepstral Mean Normalization (CMN). CMN is implemented by subtracting from each coefficient the average of the corresponding parameter in the signal (Furui, 1997):

$$\hat{O}_{n,j,m} = O_{n,j,m} - \overline{O}_{n,m} \quad \text{equation (4)}$$

wherein $\hat{O}_{n,j,m}$ is the coefficient "m" in window "j" after CMN; and, $\overline{O}_{n,m}$ is estimated according to (2). The idea of CMN is to make the average of coefficients equal to zero to remove the effect of the convolutional noise H(w), which corresponds to the transmitter channel or microphone. In the framework of the application considered here, CMN presents two problems (Furui, 1997):

The signal must be long enough so that the average $\overline{O}_{n,m}$ can be accurately estimated; this is not consistent with the herein considered application which requires short sentences for enrolling and verification.

Also, part of the client information is in $\overline{O}_{n,m}$, so some of the client information should also be eliminated if the average of the coefficients is made equal to zero.

Figure 8:
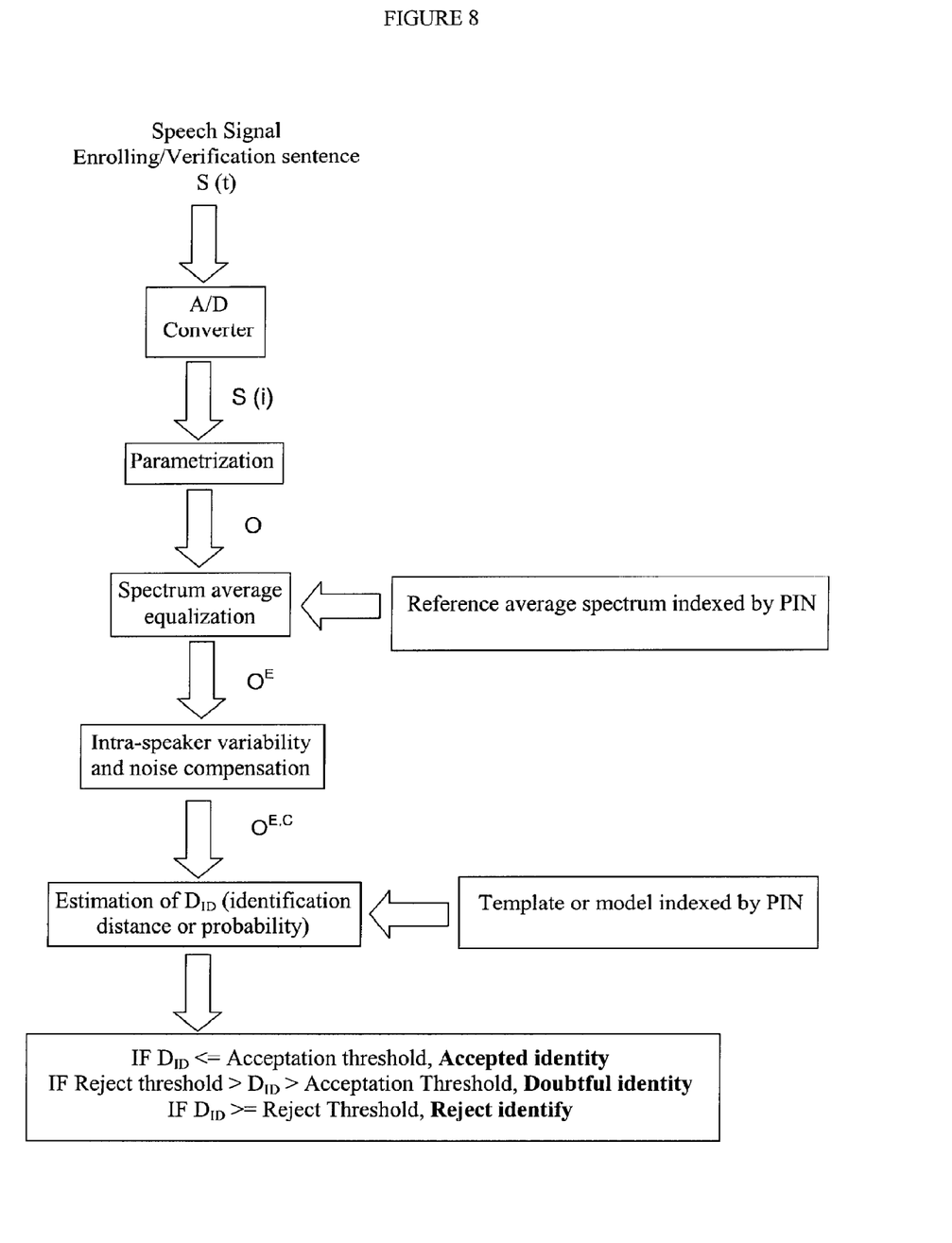
FIG. 8 shows a blocks diagram of the proposed speaker verification method.

To counteract these limitations the present invention proposes an equalization to preserve the average of coefficients (or average spectrum) from the enrolling to the verification procedure (FIG. 8). If $O^E = [O_1^E, O_2^E, O_3^E, O_j^E, \ldots, O_J^E]$ corresponds to the verification signal after the parametrization and equalization procedures, wherein $O_j^E = [O_{j,1}^E, O_{j,2}^E, O_{j,m}^E, \ldots, O_{j,M}^E]$ represents the "M" parameter vector of window or frame "j" in the verification signal, then, $$O_{j,m}^E = O_{j,m} - \overline{O}_m + \overline{O}_{e,m} \quad \text{equation (5)}$$

wherein $O_{j,m}$ corresponds to coefficient "m" in window "j" in the parametrized signal before the equalization; $\overline{O}_m$ is the average of coefficient "m" before the equalization estimated with (2); and, $\overline{O}_m$ is the average of coefficient "m" estimated on enrolling as described in (1). According to FIG. 7, $\overline{O}_{e,m}$ correspond to the spectrum average in the logarithmic domain that depends on: the client; the pronounced sentence; and, the telephone line. In the case of the instead application, the client must always perform the enrolling and verification calls from the same telephone number. Therefore, H(w) should be constant. Also, for a given client, enrolling and verification employs the same sentence. Observe that (5) corresponds to the process of spectrum equalization of FIG. 8. Finally, it is worth emphasizing that the equalization procedure described here is designed for short enrolling/verification sentences.

The intra-speaker variability and the additive noise compensation are achieved by the unsupervised signal compensation proposed here, instead of adapting the client template or model. The advantage of the procedure adopted in this invention is related to the fact that an error in the template or model adaptation propagates in time. In contrast, the proposed compensation is done on a signal-by-signal basis. The idea is to eliminate the differences between the signal and the template or model if these are small. If $O^{E,C}$ corresponds to the equalized and compensated parametrized signal, $O_j^{E,C} = [O_{j,1}^{E,C}, O_{j,2}^{E,C}, \ldots O_{j,m}^{E,C}, \ldots, O_{j,M}^{E,C}]$ corresponds to the "M" parameter vector of window "j" in $O^{E,C}$, $$O_j^{E,C} = O_j^E + \Delta_j \quad \text{equation (6)}$$

wherein $\Delta_j$ is the correction vector applied to frame $O_j^E$ before compensating:

$$\Delta_j = \begin{cases} \arg_X[dist(O_j^E + X, P_{PIN}) = 0] & \text{if } dist(O_j^E, P_{PIN}) \leq UC \\ \arg_X\{dist(O_j^E + X, P_{PIN}) = f[dist(O_j^E, P_{PIN})] \times dist(O_j^E, P_{PIN})\} & \text{if } UC \leq dist(O_j^E, P_{PIN}) \leq UL \\ 0 & UL \leq dist(O_j^E, P_{PIN}) \end{cases} \quad \text{equation (7)}$$

wherein, $dist(O_j^E, P_{PIN})$ is the distance between vector $O_j^E$ and the customer template or model $P_{PIN}$; UC is a proximity threshold; UL is a remoteness threshold; and, $f[\ ]$ is a function of $dist(O_j^E, P_{PIN})$. It is worth emphasizing that the compensation method described here is designed to counteract the problem of limited enrolling data.

Figure 5:
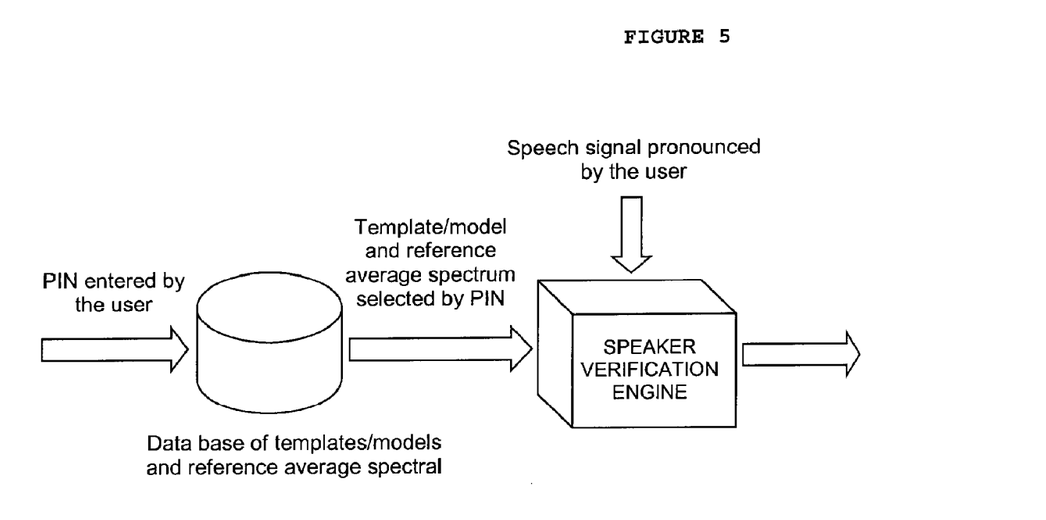
FIG. 5 presents the indexing scheme of voice print templates by means of the client's PIN for its use in the identity verification system.

FIG. 5 shows the indexing scheme of user print voice models and reference average spectrum by means of PIN.

Herein, the print voice pattern and reference average spectrum are employed by the identity verification method to decide if the speech signal provided by the user corresponds to the client associated to the PIN.

The method of the present invention comprises the steps of:

registering one or more system clients by entering, for each system client, a user name for a client user, an enrolling/verification sentence, a personal identification number (PIN) associated to the client user and a telephone number from where a subsequent enrolling and verification steps will take place;

enrolling the client user comprising requesting each client user to enter the associated PIN and to pronounce the enrolling/verification sentence, thereby providing voice signals;

generating a template and a reference average spectrum according to equation (1) with the voice signals provided by the user in the enrolling step; and storing and indexing the template and the reference average spectrum with the PIN associated to the client user;

prompting the client user during a future verification event to enter the PIN and to pronounce the enrolling/verification sentence associated with the PIN, thereby providing a speech signal;

estimating a verification distance, in the future verification event, between the template indexed by the entered PIN and the speech signal pronounced by the client user; using the reference average spectrum indexed by the entered PIN;

validating that the telephone number employed in the future verification event is the same as the telephone number employed in the enrolling step;

deciding if the speech signal pronounced by the client user has been validated based on the verification distance;

repetiting the steps of prompting, estimating, validating and deciding for a limited number of times, if the speech signal pronounced by the client user fails validation; and accepting or rejecting the future verification event.

The enrolling and verification method in the context of the application considered here are described as follows:

i) Introducing the system client's data—Before enrolling a user as client user, for each system client, his/her data needs to be entered up in the system database. Basically, the following information is required for every new client: his/her full name; the sentence (e.g. first and family name) that the client will have to pronounce in the enrolling and verification procedures; a personal identification number (PIN) associated to the client user; and a telephone number allocated to the user from where a subsequent enrolling and validation steps will take place. Alternatively, further information could also be provided such as the client's national identification number.

ii) The enrolling procedure—Enrolling takes place after the client user's information has been introduced in the system database and comprises (FIG. 1):

a) Each client user calls the system from a telephone number that was assigned to him/her according to the procedure described above. The telephone number employed in the future verification event must be the same as the telephone number employed in the enrolling step.

b) The system requests the client to enter his/her associated PIN.

c) Then the system requests the client to pronounce the enrolling/verification sentence, thereby providing voice signals (e.g. first and family names) "n" times, particularly more than 3 times.

d) The system generates a template and the average of coefficients (or reference average spectrum) according to equation (1) with the voice signals provided by the client.

Both the template and the average spectrum are indexed with the PIN associated to the client user.

iii) Entrance or exit verification with an inbound call—It takes place every time a client user requires it, and comprises:

a) A user calls the system from the telephone number that was allocated to him/her as described above.

b) The system requests the user to enter his/her associated PIN.

c) The system prompts the user to pronounce once the enrolling/verification short sentence (voice signal).

d) The system compares the user signal with the template associated to the entered PIN and makes a decision about validating or not the user as the client user claimed. The verification distance estimation makes use of the average spectrum also indexed by the entered PIN. The system can also validate if the telephone number employed in the verification (by making use of "ANI") is the same as the telephone number employed in the enrolling step. The system can request the user to repeat the enrolling/verification sentence to improve the reliability of the identity validation decision and repeat the steps of estimating, validating and deciding for a limited number of times, if the speech signal pronounced by the client user fails validation.

e) Finally, if the user is accepted as valid client user, his/her entrance or exit is registered with the following information:
   date and hour of the validation event;
   recorded voice signals (speech signals) used in the validation event;
   result of the identity validation by voice;
   result of the telephone number validation.

f) The automatic voice identity validation decision can be validated itself at any time with the subjective analysis, by a referee, of the recorded speech signals.

iv) Identity verification with an outbound call—It takes place based on the system configuration. The procedure is composed of the following steps (FIG. 3):

a) The system calls the telephone number assigned to the client whose presence needs to be verified.

b) The system requests the possible client to introduce his/her PIN.

c) Then, the system requests the client to pronounce the enrolling/verification sentence.

d) The system compares the user signal with the client template or model associated to his/her PIN and takes a decision about validating or not his/her identity (FIG. 8). The verification distance estimation makes use of the average spectrum also indexed by the entered PIN. The system can also request the user to repeat the enrolling/verification sentence to improve the reliability of the identity validation decision.

e) Finally, the validated client presence is registered with the following information:
   date and hour of the validation;
   recorded voice signals used in the validation;
   result of the identity validation by voice;

f) The automatic voice identity validation decision can be validated itself at any time with the subjective analysis, by a referee, of the recorded speech signals (v) Activity type verification—It takes place every time the client requires it. The procedure is divided in the following steps (FIG. 4):

a) The client calls the system from the telephone number that was allocated to him/her as described above.

b) The system requests the client to enter his/her PIN.

c) Then, the system prompts the client to pronounce once the enrolling/verification short sentence.

d) The system compares the client signal with the template or model associated to his/her PIN and takes a decision about validating or not his/her identity. The verification distance estimation makes use of the average spectrum also indexed by the entered PIN. The system can also identify the telephone number from where the call is made (by making use of "ANI") and compare this telephone number with the one associated to the PIN. The system can also request the client to repeat the enrolling/verification sentence to improve the reliability of the identity validation decision.

e) Once the individual is validated, the system requires the client to enter the type of activity he/she is starting, carrying out or finishing. The type of activity can be entered up with touch tones or by voice if a speech recognizer is employed. The informed activity could be a meeting, a training session, a customer's visit, etc.

f) The client's activity is registered with the following information:
date and hour;
recorded voice signals used in the validation;
result of the identity validation by voice;
type of activity.
result of the telephone number validation.

The automatic voice identity validation decision can be validated itself at any time with the subjective analysis, by a referee, of the recorded speech signals.

It is worth emphasizing that the speaker verification engine used by the current human resources control method is characterized by:

The template or model and the average of coefficients (or reference average spectrum) generated with the speech signals provided by the client in the enrolling procedure. The current identity verification procedure with voice employs an equalization method that makes use of the fact that, for a given client, enrolling and verification are done from the same telephone number and with the same sentence. This allows using short enrolling/verification voice signals, which in turn minimizes the telephone traffic in this large-scale application.

The identification distance (which is also termed verification distance or probability), $D_{ID}$ (FIG. 8), that results from processing the verification speech signal with the template/model and the average spectrum. The estimation of $D_{ID}$ employs an efficient intra-speaker variation and noise compensation method that allows short enrolling sessions. This maximizes the usability of the system and makes possible the supervision of enrolling with human operators.

Comparison of $D_{ID}$ with the acceptance or rejecting thresholds to take a decision about the user identity. Three possibilities can be considered: accepted; doubtful; and, rejected.

REFERENCES

Barras, C., Meigner, S., Gauvain, J. C. "Unsupervised online adaptation for speaker verification over the telephone". ODYSSEY 2004—The Speaker and Language Recognition Workshop, pp. 157-160, 2004.

Furui, S.; "Recent advances in speaker recognition". Pattern Recognition Letters, Vol. 18, pp. 859-872, 1997.

Mariethoz, J., Bengio, S. "A comparative study of adaptation methods for speaker verification". International Conference ICSLP 2000, pp. 742-745, 2000.

What is claimed is:

1. A large-scale attendance, productivity, activity and availability biometric control method using the telephone network, with speaker verification technology based on limited enrolling data and short verification sentences, wherein said method comprises the steps of:

registering one or more system clients by entering, for each system client, a user name for a client user, an enrolling/verification sentence, a personal identification number (PIN) associated to the client user and a telephone number from where subsequent enrolling and verification steps will take place;

enrolling the client user comprising requesting each client user to enter the associated PIN and to pronounce the enrolling/verification sentence, thereby providing voice signals;

generating a template and a reference average spectrum according to equation (1)

$$\overline{O}_{e,m} = \frac{1}{N}\sum_{n=1}^{N} \overline{O}_{n,m} \qquad (1)$$

with the voice signals provided by the user in the enrolling step, where $\overline{O}_{n,m}$ is the average of the $m^{th}$ coefficient in the parameter vectors within the $n^{th}$ enrolling speech signal;

$\overline{O}_{e,m}$ is the average of the $m^{th}$ coefficient in the parameter vectors within the "N" enrolling speech signals;

"N" is the number of enrolling speech signals;

storing and indexing the template and the reference average spectrum with the PIN associated to the client user;

prompting the client user during a future verification event to enter the PIN and to pronounce the enrolling/ verification sentence associated with the PIN, thereby providing a speech signal;

estimating a verification distance (or probability), in the future verification event, between the template indexed by the entered PIN and the speech signal pronounced by the client user; using the reference average spectrum indexed by the entered PIN;

validating that the telephone number employed in the future verification event is the same as the telephone number employed in the enrolling step;

deciding if the speech signal pronounced by the client user has been validated based on the verification distance (or probability), wherein the intra-speaker variability and additive noise compensation is performed with an unsupervised compensation of the signal, instead of adapting the user pattern or model, the intra-speaker variability and additive noise compensation, consisting of eliminating the differences between the signal and template or model if these are small;

repeating the steps of prompting, estimating, validating and deciding for a limited number of times, if the speech signal pronounced by the client user fails validation; and accepting or rejecting the future verification event.

2. The method according to claim 1, wherein in the enrolling step, the client user provides a plurality voice signals, wherein the plurality is "N", and each of the "N" voice signals is processed by an analog-to-digital converter (A/D), and wherein the digital signals are parameterized, through the following parameterization procedure:

dividing each signal in a constant length "windows" sequence (based on the samples number);

performing an analysis on the spectral logarithm domain on each window, which results in a parameter vector, wherein each digitised signal is represented by a coefficients or parameters vectors sequence:

$$S^n(i) \xrightarrow{\text{Parametrization}} O_n = [O_{n,1}, O_{n,2}, O_{n,3}, \ldots, O_{n,j}, \ldots, O_{n,J_n}]$$

wherein $O_{n,j}=[O_{n,j,1}, O_{n,j,2}, \ldots, O_{n,j,m}, \ldots, O_{n,j,M}]$ denotes the "j" frame or window vector "M" parameters, of signal "n"; and, "$J_n$" is the "n" signal length expressed on window numbers;

thereby obtaining the user template and the reference average spectrum, wherein the reference average spectrum is represented by the average of coefficients within the enrolling speech signals and depends on: the user, the enrolling/validation sentence, and the telephone line, and where the average spectrum corresponds to:

$$\overline{O}_e = [\overline{O}_{e,1}, \overline{O}_{e,2}, \ldots, \overline{O}_{e,m}, \ldots, \overline{O}_{e,M}] \text{ wherein,}$$

$$\overline{O}_{e,m} = \frac{1}{N}\sum_{n=1}^{N} \overline{O}_{n,m} \text{ and } \overline{O}_{n,m} = \frac{1}{J_n}\sum_{j=1}^{J_n} O_{n,j,m}.$$

3. The method according to claim 2, wherein the received signal can be defined as:

$$y(t)=h(t)*[s(t)+r(t)]$$

where * denotes convolution; $r(t)$ additive noise; and, $h(t)$ o $H(w)$, where $H(w)$ is the Fourier transform of $h(t)$, is the transmitter channel also denominated convolution noise.

4. The method according to claim 3 wherein $O^{E,C}$ corresponds to the parameterized, equalized and compensated signal,
and $O_j^{E,C}=[O_{j,1}^{E,C}, O_{j,2}^{E,C}, \ldots, O_{j,m}^{E,C}, \ldots, O_{j,M}^{E,C}]$ is the "M" coefficient parameter vector corresponding to window "j" of $O^{E,C}$, $O_j^{E,C}=O_j^E+\Delta_j$
where $\Delta_j$ is the correction vector applied to the $O_j^E$ frame before compensating:

$$\Delta_j = \begin{cases} \arg_X[dist(O_j^E + X, P_{PIN}) = 0] & \text{if } dist(O_j^E, P_{PIN}) \leq UC \\ \arg_X\{dist(O_j^E + X, P_{PIN}) = f[dist(O_j^E, P_{PIN})] \times dist(O_j^E, P_{PIN})\} & \text{if } UC \leq dist(O_j^E, P_{PIN}) \leq UL \\ 0 & \text{if } UL \leq dist(O_j^E, P_{PIN}) \end{cases}$$

wherein, $dist(O_j^E, P_{PIN})$ is the distance between window "j", $O_j^E$, and the client model or template, $P_{PIN}$; UC is the proximity threshold; UL is the out-of-proximity threshold; and, $f[]$ is a function of $dist(O_j^E, P_{PIN})$.

5. The method according to claim 4, wherein the print voice pattern and the reference average spectrum are employed to decide if the speech signal provided by the user, in a validation procedure by telephone, corresponds to the PIN-associated client; wherein the same parameterization procedure that is used in the enrolling before equalization step is applied; if $O^E=[O_1^E, O_2^E, O_3^E, \ldots, O_j^E, \ldots, O_J^E]$ corresponds to the verification signal after the parameterization and equalization, wherein $O_j^E=[O_{j,1}^E, O_{j,2}^E, \ldots, O_{j,m}^E, \ldots, O_{j,M}^E]$ denotes the "j" frame or window of "M" parameter vector, then, $$O_{j,m}^E = O_{j,m} - \overline{O}_m + \overline{O}_{e,m}$$

wherein $O_{j,m}$ corresponds to the coefficient "m" of window "j" in the parametrized signal before equalizing; $\overline{O}_m$ is the average coefficient "m" before equalization, estimated with the verification signal; and, $\overline{O}_{e,m}$ is the average coefficient "m" estimated in the enrollment; and $\overline{O}_{e,m}$ corresponds to the average spectrum that depends on the client user, the pronounced phrase and the telephone line.

6. The method according to claim 1, wherein the registration of a new client in the system, includes the steps of:
   i) introducing the client data; and
   ii) the enrolling procedure.

7. The method according to claim 1, wherein the use of this biometric control method is included in at least one of the following procedures:
   i) the entrance or exit verification with an inbound call;
   ii) the identity verification with an outbound call; and
   iii) the reporting of activity.

8. The method according to claim 7, wherein the entrance or exit verification takes place every time the user requires, and comprises:
   a) the user calling the system from the telephone number that was assigned to him/her as described above;
   b) the system requesting the user to enter his PIN;
   c) the system requesting the user to pronounce once the short enrolling/validation sentence;
   d) the system estimating the verification distance (or probability) between the template or model indexed by the entered PIN and the speech signal pronounced by the user; the verification distance (or probability) estimation making use of the average spectrum indexed by the entered PIN; and wherein the system can request the user to repeat the enrolling phrase to perform a more reliable decision;
   e) the system registering the user entrance or exit with the following information:
      date and hour of the validation;
      the recorded voice signals used in the validation;
      the voice identity validation result; and
      the result of the telephone number validation; and
   f) the automatic voice identity validation decision can be validated itself at any time with the subjective analysis, by a referee, of the recorded speech signals.

9. The method according to claim 8, wherein the system compares the signal provided by the client user with the PIN-associated template by using the reference average spectrum in the identity validation as follows:
   a) the identification distance (or probability), $D_{ID}$ (shown in FIG. 8), that results from processing the verification speech signal with the template/model and the average of coefficients; the estimation of $D_{ID}$ employs an efficient intra-speaker variation and noise compensation method that allows short enrolling sessions; this maximizes the usability of the system and makes possible the supervision of enrolling with human operators; and
   b) comparing $D_{ID}$ with the acceptance or rejecting thresholds to take a decision about the user identity; three possibilities can be considered: accepted, doubtful, and rejected.

10. The method according to claim 1, wherein the introduction of the client data includes: full name; the enrolling/verification sentence (e.g., first and family names); a PIN associated to the client user in the system; and, the telephone number allocated to the user from where enrolling and validation take place.

11. The method according to claim 1, wherein the on-line enrolling takes place only once, after the client information is entered up in the system database, the enrolling procedure comprising the steps of:
   a) the user calling the system from the assigned telephone number, which is the same one that will be employed for identity validation;
   b) the system requesting the user to enter his PIN;
   c) the system requesting the user to pronounce the enrolling/verification sentence "N" times (2, 3, 4, etc.);
   d) making use of the voice signals provided by the client, the system generating a template and the reference average spectrum associated to the client PIN, wherein the PIN identifies a given user from the others.

12. The method according to claim 11, wherein the system generates a PIN-associated-template or -model and a PIN-associated-average spectrum with the voice signals provided by the client user in the enrollment step.

13. The method according to claim 1, wherein the report of type of activity takes place every time the user requires it and is comprised of the following steps:
   a) the user calling the system from the telephone number that was allocated to him/her as described above,
   b) the system requesting the user to enter his/her PIN,
   c) then the system prompting the user to pronounce once the enrolling/verification short sentence,
   d) the system comparing the user signal with the template or model associated to his/her PIN and takes a decision about validating or not his/her identity, wherein the system can also identify the telephone number from where the call is made (by making use of "ANI") and compare this telephone number with the one associated to the PIN, and the system can also request the user to repeat the enrolling/verification sentence to improve the reliability of the identity validation decision,
   e) once the individual is validated, the system requires the user to enter the type of activity he/she is starting, carrying out or finishing, wherein the type of activity can be entered up with touch tones or by voice if a speech recognizer is employed, and the informed activity could be a meeting, a training session, a customer's visit, etc,
   f) the user's activity being registered with the following information:
      date and hour;
      recorded voice signals used in the validation;
      result of the identity validation by voice;
      type of activity; and
      result of the telephone number validation, and
   g) the automatic voice identity validation decision being validated itself at any time with the subjective analysis, by a referee, of the recorded speech signals.

14. The method according to claim 10, wherein the introduction of the client data can further include a national identification number.

* * * * *